United States Patent [19]

Leveille

[11] Patent Number: 4,458,167

[45] Date of Patent: Jul. 3, 1984

[54] D. C. ELECTRIC MOTOR WITH IMPROVED STATOR AND ROTOR STRUCTURE

[76] Inventor: Gilles Leveille, 215, rue Mercier, Drummondville, Quebec, Canada, J2B 5G2

[21] Appl. No.: 428,543

[22] Filed: Sep. 30, 1982

Related U.S. Application Data

[63] Continuation of Ser. No. 208,078, Nov. 18, 1980, abandoned.

[30] Foreign Application Priority Data

May 7, 1980 [CA] Canada .................................. 351410

[51] Int. Cl.³ ........................................... H02K 17/00
[52] U.S. Cl. ..................................... 310/166; 310/46
[58] Field of Search ................ 318/138, 254; 290/55; 310/46, 54, 106, 230, 256, 166, 172, 269, 41 R, 46

[56] References Cited

U.S. PATENT DOCUMENTS

| | | | |
|---|---|---|---|
| 1,043,325 | 11/1912 | Lincoln | 310/230 |
| 1,233,232 | 7/1917 | Heyroth | 290/55 |
| 2,853,637 | 9/1958 | Ishikawa | 310/40 R |
| 3,064,150 | 11/1962 | Barnes | 310/154 |
| 3,585,474 | 6/1971 | Kobayashi | 318/254 |
| 3,678,359 | 7/1972 | Peterson | 318/254 |
| 4,338,536 | 7/1982 | Hallidy | 310/191 |
| 4,347,457 | 8/1982 | Sakamoto | 310/256 |

Primary Examiner—J. D. Miller
Assistant Examiner—D. L. Rebsch
Attorney, Agent, or Firm—Schwartz, Jeffery, Schwaab, Mack, Blumenthal & Koch

[57] ABSTRACT

An electric motor comprising a rotor rotating around an axis and a stator. The rotor and the stator each comprise a set of dipolar pieces regularly distributed around their respective periphery, one of these sets being inside a circle centered on the axis, the other set being outside of the same circle. Each of these sets has a different number of dipolar pieces. The motor further comprises a controlling system associated with one of the sets, preferably the stator, to furnish current coils wound on the dipolar pieces of this set so as to selectively magnetize these pieces and thus form a rotating magnetic field. In accordance with the invention, each dipolar piece has a longitudinal axis extending perpendicular to a given radius of a circle lying in a plane perpendicular to the axis of the rotor. The dipolar pieces are spaced so that the magnetization of one of the pieces of the set associated with the controlling system induces, with one piece of the other set, a magnetic circuit near the longitudinal axis of the pieces. This magnetic circuit seeks to close itself and thus induces a lever force which starts the rotor rotating. The resulting motor has fewer losses and can have a lighter structure than those already known.

13 Claims, 6 Drawing Figures

D. C. ELECTRIC MOTOR WITH IMPROVED STATOR AND ROTOR STRUCTURE

This is a continuation, of application Ser. No. 208,078, filed Nov. 18, 1980, now abandoned.

BACKGROUND OF THE INVENTION

1. Field of the Invention

The present invention relates to an electric motor operating on direct current and without contact brushes.

2. Prior Art

Various types of electric motors are presently commercially available, comprising a rotor and a stator each having a set of monopolar pieces. The motor rotates by selective magnetization of pair of monopolar pieces diametrically opposed so as to create a rotating magnetic field.

Since the pieces employed are monopolar, the induced magnetic circuit must necessarily pass through two of these pieces and thus make a deviation, passing through a large part of the stator, for example. Motors of this kind are clearly described by U.S. Pat. Nos. 3,984,711 Kordik issued on Oct. 5, 1976 and 4,048,531(Buess) issued on Sept. 13, 1977.

SUMMARY OF THE INVENTION

It is an object of the invention to provide a motor in which the losses resulting from these deviations are diminished.

It is another object of the invention to provide a motor wherein the length of the magnetic circuit is shortened by employing dipolar pieces in the rotor and the stator so that the magnetic circuit is limited essentially to these dipolar pieces without having to pass throughout the motor.

In accordance with the invention, these objects are achieved with an electrical motor comprising a rotor rotating around an axis and a stator, the rotor and the stator each comprising a set of dipolar pieces uniformly distributed around the respective periphery, one of the sets being inside a circle centered on the axis, the other set being outside of the circle. The sets each have a different number of pieces. The motor further comprises controlling means associated with one of the sets so as to supply electrical power to the dipolar pieces of the set so as to selectively magnetize these pieces and thus create a rotating magnetic field. In accordance with the invention, each dipolar piece has a longitudinal axis lying perpendicular with respect to a radius of a circle lying in a plane perpendicular to the axis of the rotor. These dipolar pieces are spaced apart so that the magnetization of one piece of the set associated with the control means forms with one piece of the other set a magnetic circuit located near the longitudinal axis of the pieces. In operation, the circuit seeks to close itself and thus creates a lever force which starts the rotor rotating.

BRIEF DESCRIPTION OF THE DRAWINGS

The above and other objects of the invention and its characteristics will be better understood with reference to the annexed drawings illustrating a preferred embodiment of the invention wherein.

DETAILED DESCRIPTION OF THE INVENTION

Figure 1:
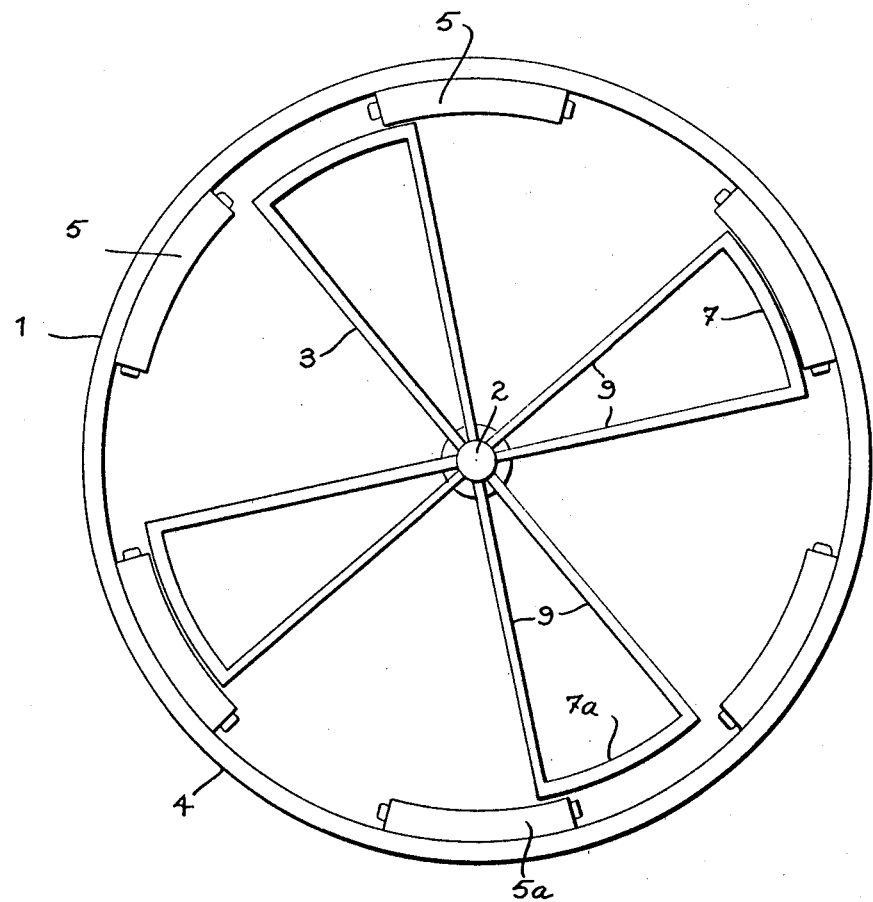
FIG. 1 illustrates a top view of a motor according to the present invention.

The motor illustrated on FIG. 1 comprises a stator 1 and a rotor 3 having an axis 2. The stator comprises six dipolar pieces 5, each having at least one coil and held by a circular armature 4 surrounding the rotor. The pieces 5 are distributed externally around the circumference of an imaginary circle centered on the axis 2. The rotor 3 comprises four dipolar pieces 7, arms 9 supporting dipolar pieces 7 and a hub centered on the axis 2 and on which are fixed the arms 9. The pieces 7 are set within the circumference of th same imaginary circle.

This particular structure of the stator and the rotor has the advantage of enabling one to construct a relatively light-weight motor.

The dipolar pieces 5 and 7 are made of laminated soft iron, and the armature 4 and the arms 9 can be made of any material sufficiently solid for the desired use of the motor. It is not necessary that this material be a good magnetic conductor since the established magnetic circuit will not pass through the arms of the rotor, nor through the armature of the stator, but will be confined essentially in the dipolar pieces.

The motor diameter, as well as the number of the dipolar pieces set on the rotor or the stator, can be varied as desired according to the technical needs or requirements. Preferably, the distance separating each dipolar piece of the stator will be approximately equal to the length of the dipolar pieces of the stator and the rotor, but this distance can be varied if a different number of dipolar pieces is used for the stator or the rotor, for example. In any case, the stator and the rotor must have a different number of pieces.

In addition to the mechanical pieces, controlling means are also provided to magnetize, at the most desirable time in the rotation cycle, the dipolar pieces 5 of the stator. These means will be described below.

The operation of the described direct current electric motor will now be described. When a piece 7a of the rotor passes near a piece 5a, magnetized by the controlling means, a magnetic circuit is created which tries to close itself. As a result, a lever effect is formed causing the center of the piece 7a to be attracted by the center of the piece 5a so as to reduce the length of the magnetic circuit. A rotating movement results. Then, the piece 5a is no longer magnetized. A fraction of a turn later, another piece 5 is magnetized to continue the cycle.

By modifying the distance between the piece 5a, when magnetized, and the piece 7a, it is possible to vary the force resulting from the lever effect described above. It is even possible to invert the direction of the rotating movement, which means that the motor will operate in reverse. The controlling means, described below, permits the modification of this distance.

Figure 2:
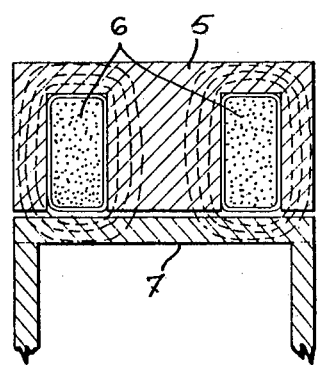
FIG. 2 transverse illustrates a sectional view of a dipole of the rotor and a dipole of the stator forming a magnetic circuit.

FIG. 2 illustrates in more detail the magnetic circuit (shown with dashed line) which is formed between a piece 7 of the rotor and a piece 5 of the stator when a current circulates in the coil of the piece 5. As can be seen, the piece 5 has the approximate shape of a downward facing "E" and has at least one coil 6 which is powered for a precise interval during the rotation cycle by controlling means. However, it is possible to employ more than one coil and to vary the exact shape of the dipolar pieces of the stator. Nevertheless, it is important that the poles induced by the coils 6 on the surface of the dipolar piece 5 of the stator confronting the pieces 7 be oriented so that the axis of each dipolar piece 5 passing through those poles be perpendicular to a radius of the rotor and parallel to the axis of this rotor, while the geometrical longitudinal axis of each dipolar piece 5 is perpendicular both to a radius and an axis of the rotor.-- It is also important that the magnetic circuit be concentrated in the area of each of the pieces 5. Obviously, a small curve is provided for each piece because of the circular shape of the motor.

It should be noted that the poles of the piece 7 of the rotor exist effectively only when the pieces 7 are near a magnetized piece 5 of the stator. Indeed, the term "dipolar" is employed here almost to distinguish the pieces employed in the present invention from the monopolar pieces otherwise employed.

Figure 3:
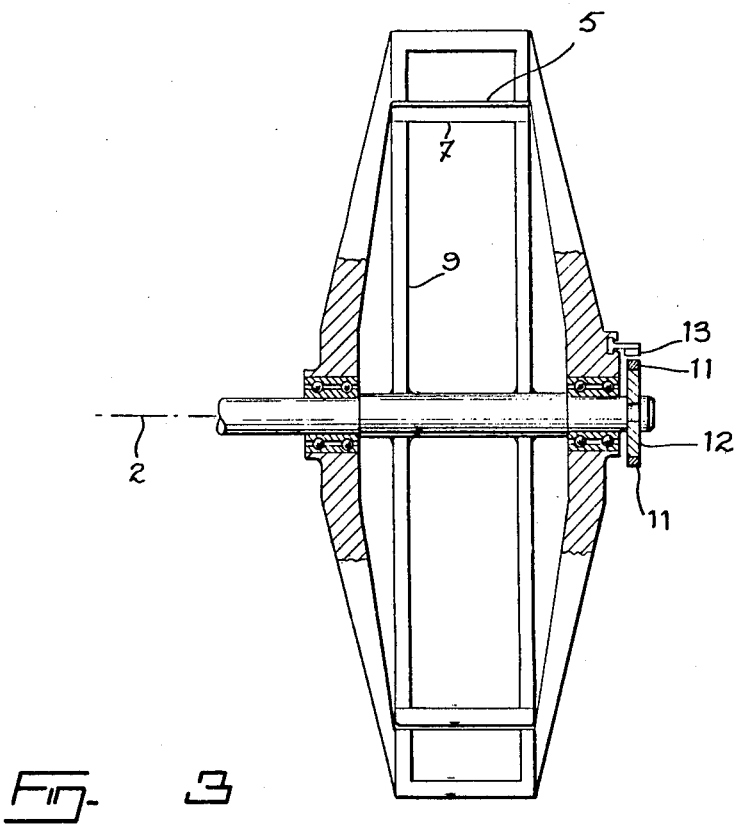
FIG. 3 illustrates a radial sectional view of the motor illustrated on FIG. 1.
Figure 4:
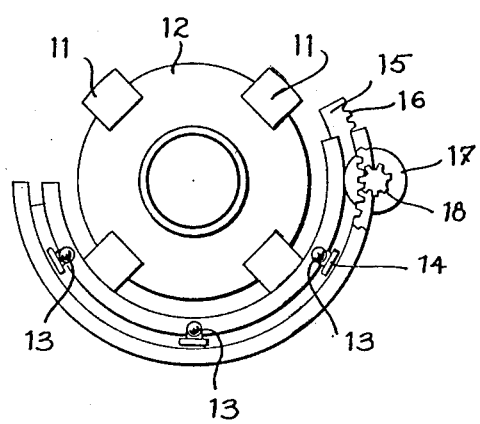
FIG. 4 illustrates a front view of a controlling system for supplying power to the coils.
Figure 5:
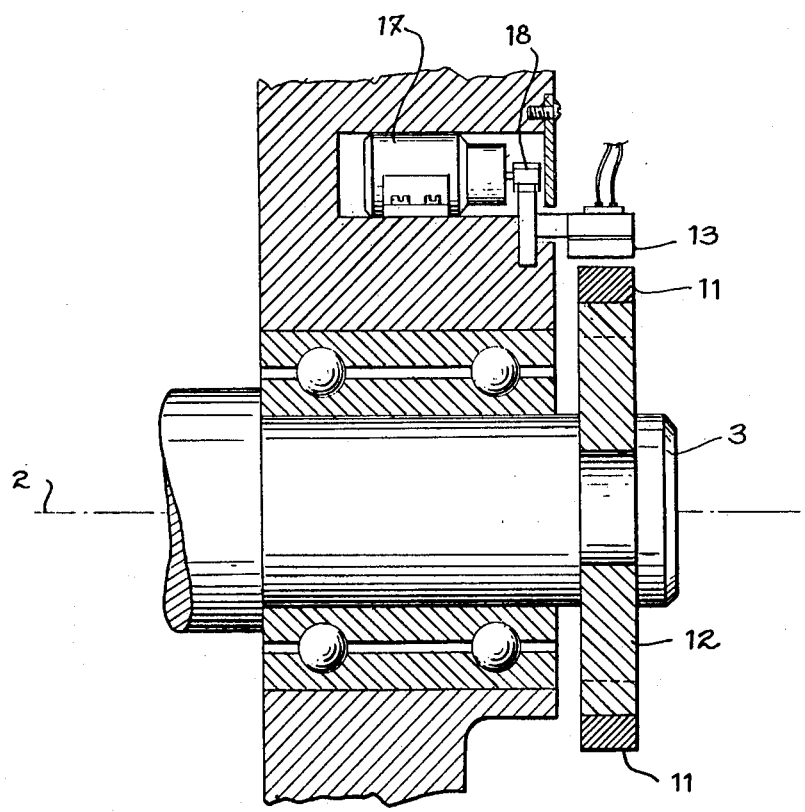
FIG. 5 illustrates a radial sectional view illustrating details of the motor near its axis.

FIG. 3 illustrates a motor section which shows the controlling means of the coils of the dipolar pieces of the stator. The FIGS. 4 and 5 illustrate these means in greater detail. These means are provided so as to vary the angle between a piece of the rotor and a piece of the stator at the time of the magnetization of the coils of the pieces of the stator. A set of magnets 11 can be seen lying on a disk-shaped rotating piece 12 which is fixed to the rotor 3 and rotates with it to selectively close the magnetic contacts 13 located on the stator. Each of these contacts 13 is associated with at least one of the coils and will control the magnetization of this coil.

These contacts 13 can be reed relays and are located on a plastic support 14 held by the second rotating piece 15, the relating angular position of which can be varied with a system of mechanical pieces or a small motor 17 which is telecontrolled. The second rotating piece 15 comprises externally a series of gear-teeth 16 meshed with teeth 18 of the motor 17.

The motor 17 can be a direct current motor telecontrolled so as to have an angular position dependent on a controlling potentiometer. By varying the position of the potentiometer, the relative position of the contact 13 and the pieces 5 of the stator is also varied, as is the angle between a piece of the rotor and a piece of the stator during magnetization of this stator piece and thus, the lever force of the motor. Various types of motors or controlling system can be provided, as a phase-locked-loop sampling the speed of the motor or the angle of the rotating pieces 15 or of the rotor of the motor 17. Of course, this controlling mechanism is by way of example only and other means giving the same result can be utilized just as easily.

Because of the contacts and the magnets are symmetrically distributed, the number of contacts can be divided by two in associating together each pair of opposite dipolar pieces of the stator and by controlling them with the same magnetic contact 13. Effectively, the magnetic contacts diametrically opposite would be closed at the same time if they were duplicated. In this way, the number of the pieces required to make the motor is reduced.

The motor 17 can have its main axis located parallel or perpendicular to the axis of the rotor 3, or even have an intermediate position. It is also possible to provide matching gears 18. By rotating this motor on one side or the other, the relative position of the contacts at their closing is varied with respect to the position of the rotor pieces. This causes a variation of the force of the lever arm created by each pair of magnetized dipolar pieces of the stator and the rotor. It is even possible to reverse rotation of the motor, as was explained hereinbefore.

Figure 6:
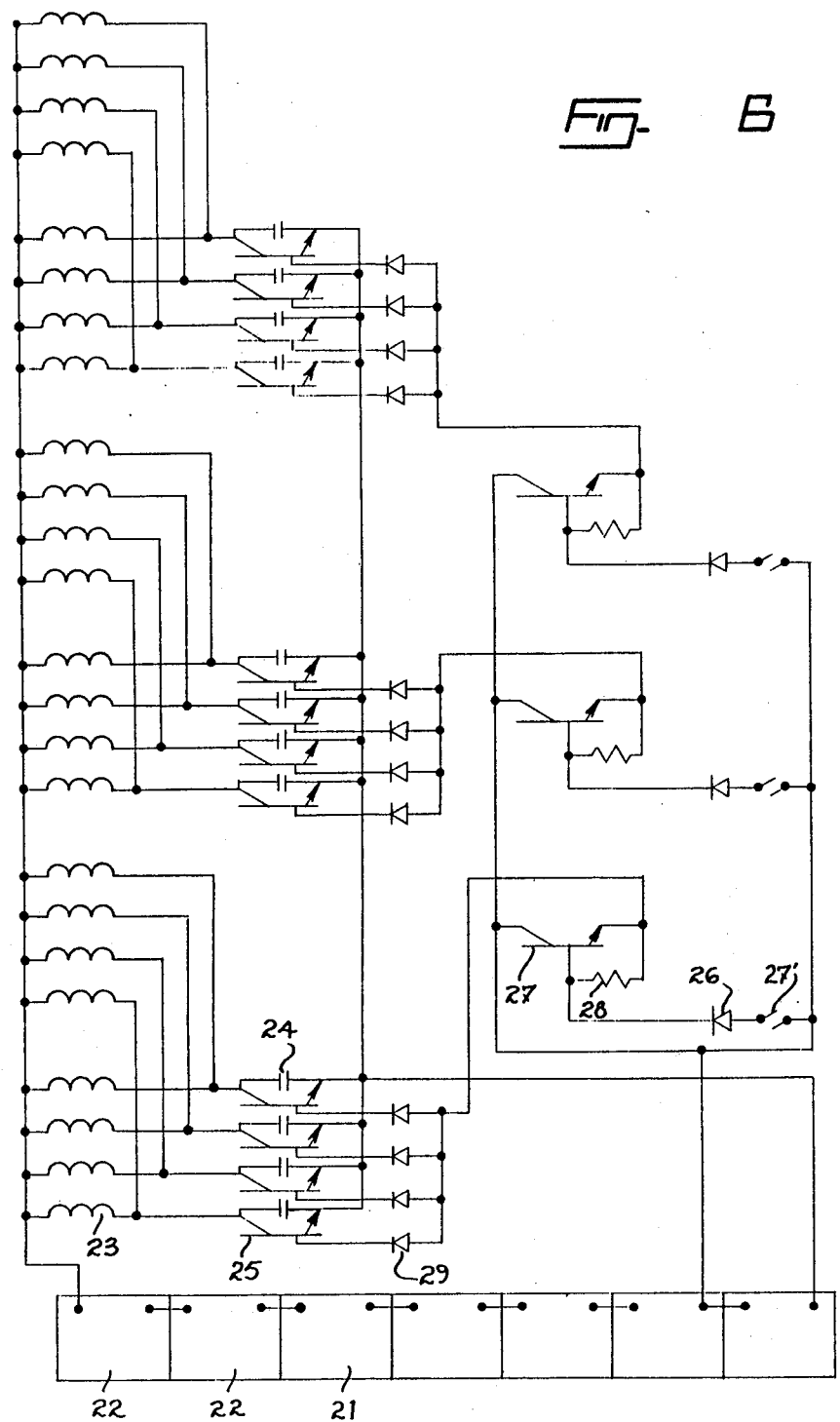
FIG. 6 illustrates an electrical circuit which can be employed to control the working of the motor.

To magnetize the coils of the stator pieces, it is possible to serially connect these coils with the magnetic contacts and the power supply. However, this can cause some reliability problems if the current necessary for powering the coils is too high. Obviously, larger contacts can be employed. However, FIG. 6 illustrates a more advantageous circuit if a more powerful motor is to be made. This circuit comprises a power supply 21 connected in series with coils 23 of the stator and transistors 25 used as electronic switches. The power supply 21 may comprise electric batteries 22 connected in series so as to have a sufficiently high voltage. This circuit works as follows:

When a contact 27' is opened, the resistor 28 polarizes the transistor 27, used as a master, so as to block it. The emitter of the transistor 27 is connected to the base of the slave transistors 25 through a diode 29, the transistors 25 are also blocked, and no current passes through the corresponding coils 23.

By closing the contact 27', current passes through the diode 26, and the master transistor 27 is thus made conductive and can then supply current passing through the diode 29 to the slave transistors 25 which are made conductive which then pass current to the coils 23. Since each master transistor 27 controls four transistors 25 and eight coils 23, when a single master contact is closed, the right coils are magnetized simultaneously. A capacitor is also provided for each transistor 25 so that the duration of the magnetization of the dipolar pieces 5 of the stator is prolonged.

In the illustrated circuit, three contacts and three pair of dipolar pieces are provided. The working of each circuit associated with each of the three contacts is similar.

It will be noted herein that the use of many coils connected in parallel permits a better distribution of the current circulating in the various transistors as well as of the magnetic circuit induced.

The circuit employed can obviously be varied. For example, it is possible to use a different type of electronic switch than transistors.

The illustrated embodiment is obviously given as a non-limitative example. It is possible to vary the various parameter like the relative size of the different pieces, the number of dipolar pieces, the electronic circuit, etc. without departing from the spirit of the invention.

While several embodiments of the invention have been described, it will be understood that it is capable of still further modifications and this application is intended to cover any variations, uses, or adaptations of the invention, following in general the principles of the invention and including such departures from the present disclosure as to come within knowledge or customary practice in the art to which the invention pertains, and as may be applied to the essential features hereinbefore set forth and falling within the scope of the invention or the limits of the appended claims.

What is claimed is:
1. An electric motor comprising:
(a) a rotor rotating around an axis,
(b) a stator positioned around said axis,
(c) each of said rotor and said stator including a set of dipolar pieces distributed around its respective periphery,
(d) a first of said sets being inside a circle centered on said axis and located in a plane perpendicular to the axis of the rotor, and a second of said sets being outside of said circle,
(e) said first and second sets having a different number of dipolar pieces,
(f) controlling means associated with one of said first and second sets, said controlling means supplying electric power to said dipolar pieces of said one set for selectively magnetizing these dipolar pieces and forming a rotating magnetic field,
(g) each of said dipolar pieces of said one set comprising a separate magnetic core which is substantially E-shaped in cross section, which cross section is perpendicular to the circumference of said circle, said E-shaped magnetic core opening towards said circle and defining a central protuberance, and first and second outer protuberances,
(h) each of said dipolar pieces of said one set also comprising at least one coil wound around said central protuberance of said magnetic core, said coil being associated with said controlling means so as to create the rotating magnetic field,
(i) each of said dipolar pieces of the other set amongst said first and second sets comprising a magnetic core which, during rotation of said rotor, defines, with the magnetic core of any dipolar piece of said one set confronting at least in part said dipolar piece of said other set, two magnetic circuits nearly surrounding the coil of the confronting piece of said one set, through which magnetic circuits are respectively flowing two loops of magnetic flux generated by this coil upon energization of this coil by said controlling means, one of said magnetic circuits being defined through the magnetic core of said dipolar piece of said other set, and through the central protuberance and the first outer protuberance of said confronting dipolar piece of said one set, and the other of said magnetic circuits being defined through the magnetic core of said dipolar piece of said other set, and through the central protuberance and the seconnd outer protuberance of said confronting piece of said one set,
(j) said dipolar pieces being spaced apart whereby the magnetization of one of said dipolar pieces of said one set associated with the control means forms, with one of the dipolar pieces of said other set, said magnetic circuits,
(k) said magnetic circuits acting to try to close themselves and thus providing a lever force which causes rotation of said rotor,
whereby, in operation, the magnetic flux generated by the coil of each dipolar piece of said one set is used in a very efficient way to produce said lever force.

2. The motor as claimed in claim 1, wherein the dipolar pieces of the stator are located outside of said circle, and the dipolar pieces of the rotor are located inside said circle.

3. The motor as claimed in claim 1, wherein the distance separating the dipolar pieces of the stator is substantially equal to the length of each dipolar piece, and the number of pieces on the rotor is less than the number of pieces on the stator.

4. The motor as claimed in claim 1, wherein the dipolar pieces of the stator constitute said one set and the controlling means comprises a current source, a group of magnets distributed on a rotative piece separated by angles corresponding to the angles separating each dipolar piece of the rotor, and magnetic contacts located on a circle concentric with the rotating piece separated by angles corresponding to the angles separating each dipolar piece of the stator, said contacts being closed when one of said magnets of the group of magnets passes near it when the rotating piece is rotating, said controlling means further comprising another rotating piece carrying contacts and means for rotating the other rotating piece around the axis of the rotor for adjustments of the lever force and adjustment for a reverse rotation of said motor.

5. The motor as claimed in claim 4, wherein:
(a) each set has a number of dipolar pieces which is a multiple of two,
(b) the rotating piece is located on the rotor,
(c) each magnet of the group of magnets is associated with a single dipolar piece of the rotor, and
(d) each contact is associated with a pair of dipolar pieces of the stator diametrically opposed relative to the axis of the rotor, the closing of one of said contacts creating magnetization of the pair of the associated dipolar pieces.

6. The motor as claimed in claim 5, wherein the controlling means further comprises another rotating piece carrying contacts and means for rotating the other rotating piece around the axis of the rotor.

7. the motor as claimed in claim 4, wherein the controlling means further comprises mechanical means for displacing the other rotating piece carrying the contacts.

8. The motor as claimed in claim 7, wherein the mechanical means for rotating the other piece comprises a small electrical motor.

9. The motor as claimed in claim 4, wherein the coil of each dipolar piece on the stator is serially connected with a current source and one of the contacts of the controlling means.

10. The motor as claimed in claim 4, wherein the coil of each dipolar piece is connected serially with the current source and an electronic switch, said switch being controlled by one of the contacts on the controlling means.

11. The motor as claimed in claim 10, wherein the electronic switch comprises a master transistor and at least one slave transistor controlled by said master transistor.

12. the motor as claimed in claim 4, 10 or 11, wherein each dipolar piece of the stator comprises a plurality of coils connected in parallel, said plurality of coils being controlled by the same contact.

13. An electric motor according to claim 1, wherein each of said dipolar pieces has a longitudinal axis substantially perpendicular to a radius of said circle and lying in a plane substantially perpendicular to said axis of the rotor.

* * * * *